3,268,399
PESTICIDAL QUATERNARY HEXAMETHYLENE-TETRAMINE EPOXIDE SALTS
Ralph R. Langner, Lake Jackson, Tex., assignor to The Dow Chemical Company, Midland, Mich., a corporation of Delaware
No Drawing. Filed June 8, 1964, Ser. No. 373,511
13 Claims. (Cl. 167—33)

The present invention is directed to certain quaternary salt compounds and compositions containing and methods employing the compounds for the control of many pests. These compounds are salts of hexamethylenetetramine, and an epoxide compound having one of the formulas:

$$X\!-\!(\!-\!R\!-\!O\!-\!)_n\!-\!CH_2\!-\!CH\underset{O}{\overset{}{\diagdown\!\!\!\diagup}}CH_2$$

or $$XCH_2\!-\!\!\left[\begin{array}{c}-CH-CH-\\H-\!\!\!\!-\!\!\!\!-\!\!\!\!-\!\!\!\!-\\R_2\end{array}\right]\!-\!O\!-\!CH_2\!-\!CH\underset{O}{\overset{}{\diagdown\!\!\!\diagup}}CH_2$$

In these and succeeding formulae, X represents halogen, R represents ethylene, propylene or trimethylene, $n$ represents one of the integers 0 and 1, and $R_2$ represents allyloxy, allyloxypropoxy or allyloxyethoxy. The salt compounds can be represented by the following formulae:

[structure of HMTA$^+$ quaternary salt with $X^-$ counterion and $-(R-O)_n-CH_2-CH\underset{O}{\overset{}{\diagdown\!\!\!\diagup}}CH_2$ group]

and

[structure of HMTA$^+$ quaternary salt with $X^-$ counterion and $-CH_2-[-CH-CH-]-O-CH_2CH\underset{O}{\overset{}{\diagdown\!\!\!\diagup}}CH_2$ group with $R_2$ and H substituents]

In the present specification and claims, the term "halogen" is employed to designate chlorine, iodine and bromine. For purposes of convenience, the specification will sometimes employ the expression "HMTA$^+$" to represent the following structure:

[structure of hexamethylenetetramine quaternary cation]

These quaternary epoxide salts are solid materials which are soluble in water and of low solubility in many organic solvents. These compounds have been found to be useful as pesticides and parasiticides and can be applied to pests and their habitats, environment and food in parasiticidal and microbicidal amounts to obtain excellent controls of many organisms, including such plant organisms as *Pseudomonas areuginosa, Aerobacter aerogenes, Salmonella typhosa, Staphylococcus aureus, Aspergillus terreus, Rhizopus nigricans,* etc.

The compounds of the present invention are prepared by allowing hexamethylenetetramine to react and form a salt with a substituted epoxide corresponding to the formula $$X\!-\!(\!-\!R\!-\!O\!-\!)_n\!-\!CH_2\!-\!CH\underset{O}{\overset{}{\diagdown\!\!\!\diagup}}CH_2$$

or $$XCH_2\!-\!\!\left[\begin{array}{c}-CH-CH-\\H-\!\!\!\!-\!\!\!\!-\!\!\!\!-\!\!\!\!-\\R_2\end{array}\right]\!-\!O\!-\!CH_2\!-\!CH\underset{O}{\overset{}{\diagdown\!\!\!\diagup}}CH_2$$

The reaction proceeds smoothly in the absence of an inert organic solvent as reaction medium, however, it is usually preferred to employ a solvent as reaction medium to provide for improved contacting of the reactants. Representative solvents include methylene chloride, chloroform, carbon tetrachloride, dioxane, etc. The amount of the reactants to be employed is not critical, some of the product being formed when any amounts of the reactants are combined. However, when optimum yields are desired it is preferable to employ equimolar amounts of the hexamethylenetetramine and the substituted epoxide reactant. Representative substituted epoxides include 1-(3-iodopropoxy)-2,3-epoxypropane, 2'-allyloxy-1'-bromo-3' - (2,3-epoxypropoxy)propane, 1'-(2-(allyloxy)ethoxy)-3'-bromo-2'-(2,3-epoxypropoxy)propane and 2'-(2-(allyloxy)propoxy) - 1'-chloro-3'-(2,3-epoxypropoxy)propane. The reaction can be carried out at temperatures between 25 and 100° C. and preferably at temperatures between 50, and 75° C. It is preferable to maintain the reactants at the reaction temperature until there is a substantial cessation in the precipitation of the solid product indicating that the reaction is nearly complete.

In carrying out the reaction, the reactants and solvent reaction medium, if employed, are combined in any order or fashion. Following the mixing and contacting, the mixture is maintained at the reaction temperature until there is a substantial cessation in the formation of the solid product. Following the reaction period, the solid product can be collected by conventional procedures such as filtration, decantation or evaporation of the solvent reaction medium. The product can then be employed to protect various environments against microbiological contamination and degradation due to the growth or presence of microorganisms.

The following examples serve merely as illustrations and are not intended to be limiting.

*Example 1.—Hexamethylenetetramine salt of epichlorohydrin*

$$HMTA^{\oplus}\!-\!CH_2\!-\!CH\underset{O}{\overset{}{\diagdown\!\!\!\diagup}}CH_2 \quad \overset{\ominus}{Cl}$$

Hexamethylenetetramine (560 grams; 4 moles) and epichlorohydrin (2360 grams; 25.5 moles) were combined with stirring. Stirring was thereafter continued and the mixture maintained at 60° C. for eight hours to insure completion of the reaction. During the reaction, the salt product precipitated in the reaction mixture as a crystalline solid. Following the reaction period, the solid product was collected by filtration and dried in vacuo. The dried product decomposed at 170° C. The hexamethylenetetramine-epichlorohydrin salt product was found to have a total chloride content of 16.27 percent as compared with a theoretical content of 15.1 percent.

*Example 2.—Hexamethylenetetramine salt of 1-(2-chloroethoxy)-2,3-epoxypropane*

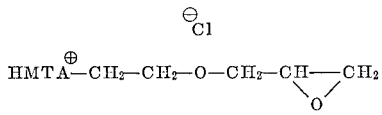

Hexamethylenetetramine (14 grams; 0.1 mole) and 1-(2-chloroethoxy) - 2,3 - epoxypropane (25 grams; 5.45 moles) were dispersed with stirring in 50 milliliters of methylene chloride. The resulting mixture was then continuously stirred and maintained at 50° C. for 48 hours. Following this period, the reaction mixture was heated to 80° C. and maintained at that temperature with stirring for 16 hours to insure completion of the reaction. The crystalline hexamethylenetetramine salt of 1-(2-chloroethoxy)-2,3-epoxypropane which precipitated during the reaction was separated by filtration and the separated product dried in vacuo. The dried product was found to decompose at 214° C. and to have an ionic chloride content of 13.55 as compared with a theoretical content of 12.8 percent.

*Example 3.—Hexamethylenetetramine salt of 1-(2-(allyloxy)-ethoxy)-3'-bromo-2'-(2,3-epoxypropoxy)propane*

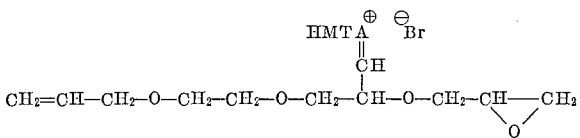

Hexamethylenetetramine (14 grams; 0.1 mole) and 1'-(2-(allyloxy)ethoxy) - 3' - bromo - 2' - (2,3-epoxypropoxy)propane (29 grams; 0.1 mole) were dispersed with stirring in 50 milliliters of methylene chloride. The resulting mixture was then processed exactly as described in Example 2. Following the reaction, the solid product was collected by filtration and dried in vacuo at 60° C. The dried hexamethylenetetramine salt of 1'-(2-(allyloxy)ethoxy) - 3' - bromo-2'-(2,3-epoxypropoxy)propane was found to decompose at 236° C. and to have a total chloride content of 18.6 percent as compared to the theoretical content of 18.2 percent.

*Example 4.—Hexamethylenetetramine salt of epibromohydrin*

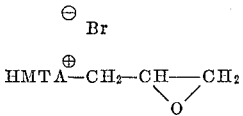

Hexamethylenetetramine (14 grams; 0.1 mole) and epibromohydrin (27.5 grams; 0.2 mole) were combined with stirring. Stirring was thereafter continued and the reaction mixture was maintianed at 80° C. for 20 hours to insure completion of the reaction. Following the reaction period the excess epibromohydrin was removed under vacuum leaving the hexamethylenetetramine salt product as a solid. This solid product decomposed at 212° C.

In a similar manner other salts of the present invention are prepared of which the following are representative.

Hexamethylenetetramine salt of 1-(2-bromoethoxy)-2,3-epoxypropane by reacting together hexamethylenetetramine and 1-(2-bromoethoxy)-2,3-epoxypropane.

Hexamethylenetetramine salt of 2'-(2-(allyloxy)-ethoxy)-1'-iodo-3'-(2,3-epoxypropoxy)propane by reacting together hexamethylenetetramine and 2' - (2-(allyloxy)ethoxy)-1'-iodo-3'-(2,3-epoxypropoxy)propane.

Hexamethylenetetramine salt of 1'-(2-(allyloxy)propoxy)-3'-chloro-2'-(2,3-epoxypropoxy)propane by combining hexamethylenetetramine and 1'-(2-(allyloxy)propoxy)-3'-chloro-2'-(2,3-epoxypropoxy)propane.

Hexamethylenetetramine salt of 1'-(3-(allyloxy)propoxy)-3'-bromo-2'-(2,3-epoxypropoxy)propane by combining hexamethylenetetramine and 1'-(3-(allyloxy)propoxy)-3'-bromo-2'-(2,3-epoxypropoxy)propane.

The compounds of the present invention or compositions containing the same can be applied to pests and their habitats and foods in pesticidal, parasiticidal, microbicidal and/or fungicidal amounts to obtain excellent controls and kills of many organisms. The compounds may be included in inks, adhesives, soaps, detergents, cutting oils, oil or latex paints, textiles, paper or wood and wood products to prevent mold and mildew and the degradation of such products resulting particularly from the attack of the bacterial and fungal plants. Additionally, the compounds can be used as the toxic constituent of compositions for the control of the fungal, blight diseases of various terrestrial plants and plant parts and the protection of seeds and emerging seedlings from the attack of the organisms of mold and mildew and the fungal complex of damping off and rot.

The compounds conveniently can be employed in liquid or dust formulations. In such usage, the compounds are modified with one or a plurality of adjuvants or helpers including water, glycols, glycerine, polyglycols, organic solvents, oils such as those of vegetable, mineral or synthetic origin, petroleum oils, petroleum distillates, castor oils or other liquid carriers, lanolin, wax, surface active dispersing agents and finely divided solids such as chalk, talc or bentonite. In such compositions, the adjuvant can be an oil-in-water or water-in-oil emulsion, a mixture of water and surface active agent, a mixture of oil and a surface active agent, a wettable powder, or an aqueous dispersion of a wettable powder. Depending upon the concentration of the parasiticide compounds in such formulations, the augmented compositions are adapted to be distributed on plants or plant parts, or in soil, inks, adhesives, soaps, detergents, cutting oils, paints, textiles, paper or wood or wood products, or to be employed as concentrates and subsequently diluted with additional liquid or solid adjuvants to produce the ultimate treating compositions. The preferred organic solvent carriers are those of such volatility that they evaporate from the matter treated and leave little permanent residue therein. A preferred liquid adjuvant is a carefully cut petroleum distillate fraction boiling almost entirely under 400° F. and having a flash point above about 85° F.

The compounds of the present invention or compositions containing the same can be combined with various gels, soaps and thickening agents including lanolins, polyglycols, and waxes to produce compositions in the form of cream, paste or grease-like products containing parasiticidal amounts of the active agents. Such compositions are adapted to be applied to solid surfaces such as the surfaces of wood to mitigate the attack of various organisms and particularly those bringing about the rot and decay of wood. The compounds of the present invention can also be employed in combination with other parasiticidal, bactericidal, and/or fungicidal compounds or compositions. In the composition as set forth in this and the preceding paragraphs, the adjuvant cooperates with the active agents so as to facilitate the invention and obtain an improved result.

The exact concentration of the hexamethylenetetramine salt to be employed in the treating compositions is not critical and may vary considerably provided the required amount of effective agent is supplied on the pests, the plant or plant parts including the fungal and bacterial plants and plant parts thereof, or in the soil, ink, adhesive, cutting oil, paint, textile, paper, wood and so forth. The concentration of toxicant in liquid composition generally is from about 1 to 50 percent by weight. Concentrations up to 99 percent by weight oftentimes are conveniently employed. Representative of such composition are mixtures of the salt compound and a surface active agent wherein the surface active agent is present in the amount of 1 percent or more. In dusts, the concentration of the toxicant can be from about 1 to 20 percent by weight. In compositions to be employed as concentrates, the toxicant can be present in a concentration of from 5 to 98 or 99 percent by weight.

*Example 5*

Forty-five parts by weight of hexamethylenetetramine salt of epichlorohydrin, hexamethylenetetramine salt of epibromohydrin, hexamethyleneteramine salt of 1'-(2-chloroethoxy)-2',3'-epoxypropane and hexamethylenetetramine salt of 1'-(3-(allyloxy)-propoxy)-3'-bromo-2'-(2,3-epoxypropoxy)propane are mixed and ground with 5 parts by weight of Triton X-155 to prepare water-dispersible concentrate compositions containing 90 percent by weight of one of the hexamethylenetetramine salt materials.

In a further operation, 25 parts by weight of the hexamethylenetetramine salt of epichlorohydrin, hexamethylenetetramine salt of 2'-(2-(allyloxy)ethoxy)-1'-iodo-3'-(2,3-epoxypropoxy)propane, hexamethylenetetramine salt of 1-(2-bromoethoxy)-2,3-epoxypropane and 2' - (2 - (allyloxy)propoxy) - 1' - bromo - 3'-(2,3-epoxypropoxy)propane, 10 parts by weight of Triton X-155 and 65 parts by weight of xylene are mixed together to prepare emulsifiable concentrate compositions containing 25 percent by weight of one of the hexamethylenetetramine salt compounds.

In a similar manner, 25 parts by weight of hexamethylenetetramine salt 1'-(allyloxy)-3'-chloro-2'-(2,3-epoxypropoxy)propane, hexamethylenetetramine salt of 1-(3-iodopropoxy) - 2,3 - epoxypropoxy, 1-(2-bromo-1-methylethoxy)-2,3-epoxypropane and 1-(2-chloro-2-methylethoxy)-2,3-epoxypropane, 71 parts of fuller's earth, 2 parts of an alkyl aryl sulfonate (Nacconol NR), 2 parts of a polymerized sodium salt of a substituted benzoic alkyl sulfonic acid (Daxad No. 27) are mechanically mixed and ground together to prepare concentrate compositions in the form of wettable powders containing 25 percent by weight of one of the hexamethylenetetramine salt compounds.

A mixture of 20 parts by weight of hexamethylenetetramine salt of epichlorohydrin, 0.1 part of Nacconol NR, 0.1 part of Daxad No. 27 and 200 parts of water are ball milled together to prepare a water dispersible composition.

These concentrate compositions or aqueous dispersions thereof in a small quantity of water are adapted to be employed to distribute parasiticidal amounts of hexamethylenetetramine salt compounds on pests and/or their habitats. The concentrate compositions can be dispersed in water to prepare aqueous compositions which have very desirable wetting and penetrating properties, and are adapted to distribute parasiticidal amounts of the salt compounds upon pests or their habitats such as upon the foliage, fruit and roots of terrestrial plants, upon bacterial and fungal plants, upon textiles, upon wood, in ink, glue, cutting oils, cooling waters, paints, soil, soaps, adhesives, etc.

*Example 6*

Acetone solutions containing 30 grams of various hexamethylenetetramine compounds per liter are employed for the treatment of a sandy loam soil heavily infested with the organisms *Fusarium oxysporum lycopersici* and *Rhizoctania solani*. In the treating operations, the soil is placed in sealable containers and separately injected with the acetone composition in an amount sufficient to supply 50 parts by weight of one of the hexamethylenetetramine compounds per million parts by weight of soil. Following the treatment, the containers are sealed and the soil therein mixed to insure the uniform distribution of the treating compositions. After mixing, the containers of treated soil are incubated at an average temperature of 25° C. In a check operation, sealable containers containing the same infested but untreated soil, are exposed to identical conditions with the treated soil.

After three days, the containers are opened and the portions of the treated and untreated soil cultured by the dilution plate method as described by J. T. Martin in "Soil Science" 69, No. 3, pp. 215–32 (March 1950) to determine the percent control of fungus organisms. In the latter operations, the culturing medium employed is a peptone dextrose agar (1000 milligrams of water, 10 grams of dextrose, 5 grams of peptone, 1 gram of $KH_2PO_4$, 0.5 gram of $MgSO_4 \cdot 7H_2O$ and 20 grams of agar containing 0.069 grams of rose bengal and 0.030 gram of streptomycin per liter of ultimate mixture). In the plating operations, the culturing medium is incorporated with about 0.5 gram of soil sample per liter of medium and plates thereafter poured in replicates of 3 for the treated and checked soil. The poured plates are then incubated for three days at 25° C.

After incubation, the plates are examined and counts of fungus colonies made in order to determine the percent control and kill of fungus organisms. Complete kills of the named fungal organisms is obtained when the following compounds are employed in the above operation; hexamethylenetetramine salt of epichlorohydrin, hexamethylenetetramine salt of epibromohydrin, hexamethylenetetramine salt of 1-(2-chloroethoxy)-2,3-epoxypropane and hexamethylenetetramine salt of 1'-(2-(allyloxy)epoxy)-3'-bromo-2'-(2,3-epoxypropoxy)propane.

*Example 7*

The hexamethylenetetramine salts of epibromohydrin and of epichlorohydrin, hexamethylenetetramine salts of 1-(1-iodomethylethoxy)-2,3 - epoxypropane, hexamethylenetetramine salt of 1'-(allyloxy)-3'-chloro-2'-(2,3-epoxypropoxy)propane, 2'-(3-(allyloxy)-propoxy)-1' - iodo-3'-(2,3 - epoxypropoxy)propane, hexamethylenetetramine salt of 1-(2-bromo-n-propoxy)-2,3-epoxypropane and 2'-(2 - (allyloxy)propoxy)-3'-bromo-1'-(2,3-epoxypropoxy)propane are employed for the control of the slime producing organisms, *Aspergillus terreus, Penicillium chryogenum* and *Candida pelliculosa*. In such operations, the hexamethylenetetramine materials are dispersed in aqueous suspensions containing 0.5 percent by weight of finely ground wood pulp to produce compositions containing 0.005 gram of one of the salt compounds per 100 milliliters of aqueous compositions. These compositions are thereafter inoculated with the named slime producing organisms and thereafter incubated for 24 hours at about 30° C. In a check operation, unmodified aqueous pulp suspensions are inoculated and incubated in the same fashion.

Following the incubation period, the suspensions are cultured on nutrient agar and subcultures incubated for 48 hours at 30° C. After this period, the subcultures are examined in order to determine the percent kill of the slime producing organisms. The examination shows 100 percent kills of the slime producing organisms with each salt compound. At the time of the observations, the subcultures from the unmodified check suspensions are found to be heavily overgrown with the named slime producing organisms.

*Example 8*

The hexamethylenetetramine salt of epibromohydrin, of epichlorohydrin, of 1-(2-iodoethoxy)-2,3-epoxypropane, of 1-(1-bromomethylethoxy)-2,3-epoxypropane, of 2' - (allyloxy) - 1'-chloro-3'-(2,3-epoxypropoxy)propane, and of 1'-(3-(allyloxy)propoxy)-3'-bromo-2'-(2,3-epoxypropoxy)propane are employed as preservatives in cutting oil emulsions to protect such emulsions from degradation and attack by the organisms of mold and mildew. In such operations, the salt compounds are dispersed in aqueous cutting oil emulsions containing 1 part by volume of cutting oil per 40 parts of aqueous emulsion to produce emulsion compositions containing 0.2 percent by weight of one of the hexamethylenetetramine salt compounds. The oil employed is a typical commercial cutting oil consisting essentially of light mineral oil, an organic emulsifier and an aliphatic alcohol coupling agent. These treated compositions are then heavily inoculated with a cutting oil emulsion which is heavily contaminated with the plant organisms of mold and mildew following industrial use. In a check operation, aqueous cutting oil suspensions untreated with the hexamethylenetetramine compounds are similarly inoculated.

After seven days the suspensions are subcultured on a nutrient agar and the subcultures incubated for 48 hours at 30° C. Following the incubation period, the subcultures are examined in order to determine the percent kill of bacterial organisms. The examination shows a complete kill of the organisms of mold and mildew is obtained with bath salt compounds. At the time of the observations, the subcultures from the untreated suspensions are found to support a very heavy growth of the organisms of mold and mildew.

*Example 9*

Various hexamethylenetetramine compounds are employed in paint compositions to protect the paints from the degradation attack by the organisms of mold and mildew. In such operations, the salt compounds are dispersed and incorporated in latex paint samples in the amounts of 2 percent by weight of the ultimate paint composition.

The paint that is employed in these operations is prepared by intimately blending a pigment dispersion with a letdown including a synthetic latex comprising an interpolymer of ethylacrylate, methylmethacrylate, acrylic acid and methacrylic acid. The paint that is employed has the following composition.

| Pigment dispersion: | Approximate pounds per 100 gallons |
|---|---|
| Water | 140 |
| Potassium tripolyphosphate | 1.5 |
| Titanium dioxide | 240 |
| Mica (325 mesh) | 50 |
| Calcium carbonate | 20 |
| Clay (finely ground) | 20 |
| Polypropylene glycol (molecular weight 1,200) | 4 |
| Let down— | |
| Methyl cellulose | 150 |
| Synthetic latex | 506 |
| Anti-foam agent | 10 |

Wood panels are then painted with a modified paint composition as well as with unmodified paint. The panels are dried and thereafter exposed two months in a tropical chamber at a relative humidity of 95 percent and a temperature of 82° F. Following this period, the wood panels are examined as to ascertain what control of the plant growth is obtained. The following compounds give 100 percent control of the organisms of mold and mildew; hexamethylenetetramine salt of epichlorohydrin, hexamethylenetetramine salt of epibromohydrin, hexamethylenetetramine salt of 1-(2-chloroethoxy)-2,3-epoxypropane and hexamethylenetetramine salt of 1'-(2-(allyloxy)-epoxy)-3'-bromo-2'-(2,3-epoxypropoxy)propane. At the time of the observations, the check panels painted with unmodified paint compositions are found to support a heavy growth of the organisms of mold and mildew covering approximately 75 percent of the painted surfaces.

*Example 10*

The hexamethylenetetramine salts of epichlorohydrin and epibromohydrin, hexamethylene salt of 1-(2-iodoethoxy)-2,3-epoxypropane and 1-(2-bromoethoxy)-2,3-epoxypropane are employed for the treatment of wood to protect the wood from the degradation and attack of the organisms of rot, decay and mildew. In such operations, wood blocks are treated under vacuum with a 5 percent solution of the compounds and aromatic naphtha to impregnate the wood in the amount of 0.8 of a pound of one of the hexamethylenetetramine compounds per cubic foot of wood.

The untreated blocks and the untreated check blocks are then weathered in field soil and under tropical conditions for 1 year. After such exposure, the treated blocks are found to be free from the attack of rot, decay and mildew. At the time of the observations, the untreated blocks are found to support a heavy growth of the complex of the organisms of rot and decay.

The term "plant part" as employed in the present specification and claims is intended to be inclusive of the spores, hyphae, mycelia, stems, branches, roots, foliage and germinant seeds of plants.

The starting materials represented by the formulae:

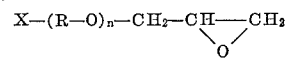

or

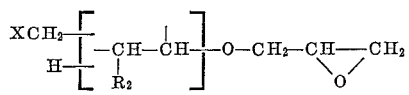

are prepared by known procedures. 1-(2-haloethoxy)-2,3-epoxypropane can be prepared by reacting ethylene halohydrin with epihalohydrin in the presence of a mineral acid to produce a halo-substituted ether-alcohol of the formula $$XCH_2CH_2\text{—}O\text{—}CH_2CH(OH)CH_2X$$

The halo-substituted ether-alcohol is then treated with a base to effect ring closure and the formation of the epoxide compound which is then collected by ordinary procedures. 1-(2-halopropoxy)-2,3-epoxypropane and 1-(1-halomethyl-ethoxy)-2,3-epoxypropane can be prepared by reacting 1-halo-2-propanol or 2-halo-1-propanol, with epichlorohydrin to produce halo-substituted ether-alcohol of the formulae

or

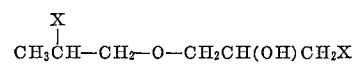

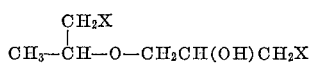

This alcohol is then treated with a base to effect the ring closure and the preparation of the corresponding epoxy compound. 1 - (3 - halopropyloxy)-2,3-epoxypropane is prepared by reacting trimethylene oxide and trimethylene halohydrin to produce the halo-substituted ether-alcohol having the formula $$XCH_2CH_2CH_2\text{—}O\text{—}CH_2\text{—}CH(OH)CH_2X$$

with a base to produce the epoxy compound.

The epoxy compounds corresponding to the formula

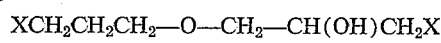

are prepared by a similar process. Thus, a halo-substituted ether-alcohol having the formula

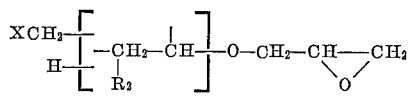

is reacted with epihalohydrin to produce a compound having the formula

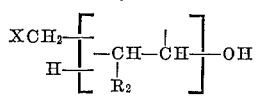

This product is then reacted with a base to effect ring closure and formation of the epoxide compound.

The halo-substituted ether-alcohol, employed in the immediately preceding paragraph having the formula

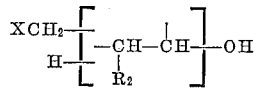

wherein $R_2$ represents allyloxyethoxy or allyloxypropoxy, is prepared by reacting allyl alcohol with ethylene oxide or propylene oxide in the presence of a base to produce an ether-alcohol having the formula $R_2$—(R)—OH. This ether alcohol is then reacted with epihalohydrin to produce the halo-substituted ether alcohol shown above. When $R_2$ represents allyloxy the halo-substituted ether alcohol corresponding to the formula

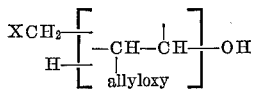

is prepared by reacting allyl alcohol and epihalohydrin.

I claim:

1. The quaternary salts of hexamethylenetetramine and an epoxide compound selected from the group consisting of compounds having the formulae

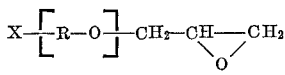

and

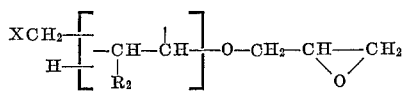

wherein X represents halogen, R represents a member of the group consisting of ethylene, trimethylene and propylene, $R_2$ represents a member of the group consisting of allyloxy, allyloxyethoxy and allyloxypropoxy.

2. A quaternary salt selected from the group consisting of the salts having the formulae

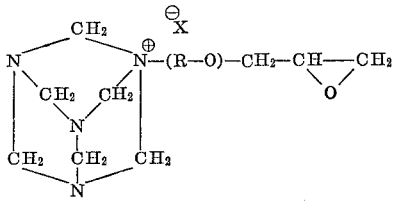

and

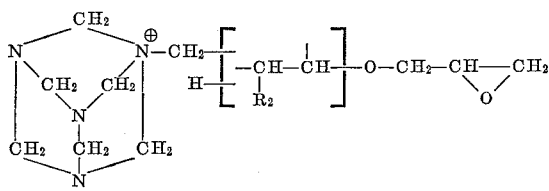

wherein X represents halogen, R represents a member of the group consisting of ethylene, trimethylene and propylene, and $R_2$ represents a member of the group consisting of allyloxy, allyloxyethoxy and allyloxypropoxy.

3. Hexamethylenetetramine salt of 1-(2-chloroethoxy)-2,3-epoxypropane.

4. Hexamethylenetetramine salt of 1'-(2-(allyloxy) epoxy)-3'-bromo-2'-(2,3-epoxypropoxy)-propane.

5. The method which comprises treating pests and their habitats with a parasiticidal amount of an active agent selected from the group consisting of hexamethylenetetramine salts having the formulae

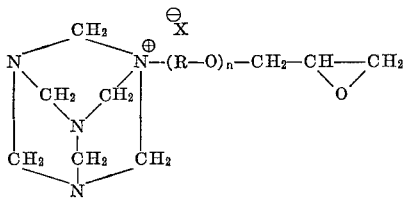

and

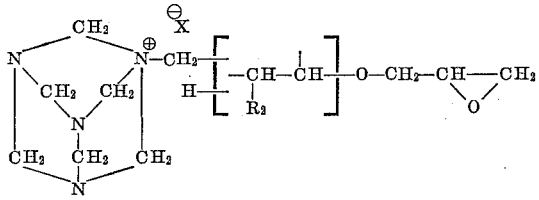

wherein X represents halogen, R represents a member of the group consisting of ethylene, trimethylene and propylene, $R_2$ represents a member of the group consisting of allyloxy, allyloxyethoxy and allyloxypropoxy, and $n$ represents one of the integers 0 and 1.

6. The method which comprises treating plants, plant parts and their habitats with a parasiticidal amount of an active agent selected from the group consisting of hexamethylenetetramine salts having the formulae

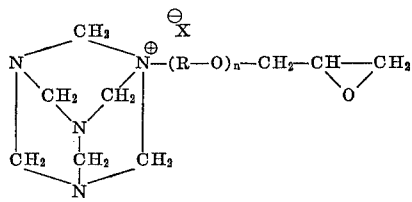

and

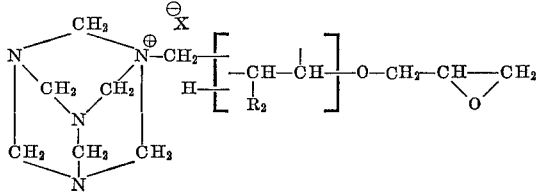

wherein X represents halogen, R represents a member of the group consisting of ethylene, trimethylene and propylene, $R_2$ represents a member of the group consisting of allyloxy, allyloxyethoxy and allyloxypropoxy, and $n$ represents one of the integers 0 and 1.

7. The composition comprising from 5 to 99 percent by weight of active ingredient in admixture with a surface active agent, the active agent being a member of the group consisting of hexamethylenetetramine salts having the formulae

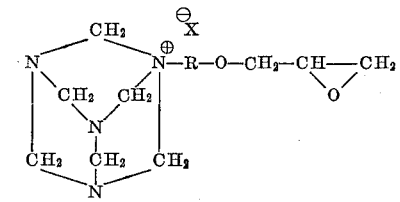

and

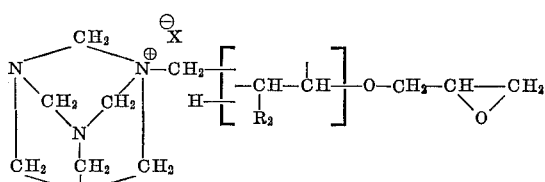

wherein X represents halogen, R represents a member of the group consisting of ethylene, trimethylene and propylene, and $R_2$ represents a member of the group consisting of allyloxy, allyloxyethoxy and allyloxypropoxy.

8. The composition comprising an oil dispersion of the composition claimed in claim 7.

9. The composition comprising an aqueous dispersion of the composition claimed in claim 7.

10. The method which comprises treating pests and their habitats with a parasiticidal amount of the hexamethylenetetramine salt of epichlorohydrin.

11. The method which comprises treating pests and their habitats with a parasiticidal amount of the hexamethylenetetramine salt of epibromohydrin.

12. The method which comprises treating pests and their habitats with a parasiticidal amount of the hexamethylenetetramine salt of 1-(2-chloroethoxy)-2,3-epoxypropane.

13. The method which comprises treating pests and their habitats with a parasiticidal amount of the hexamethylenetetramine salt of 1-(2-(allyloxy)-ethoxy)-3'-bromo-2'-(2,3-epoxypropoxy)propane.

References Cited by the Examiner

UNITED STATES PATENTS 2,844,490  7/1958  Lehmann et al. _____ 117—38

JULIAN S. LEVITT, *Primary Examiner.*

V. C. CLARKE, *Assistant Examiner.*